Figure 1:
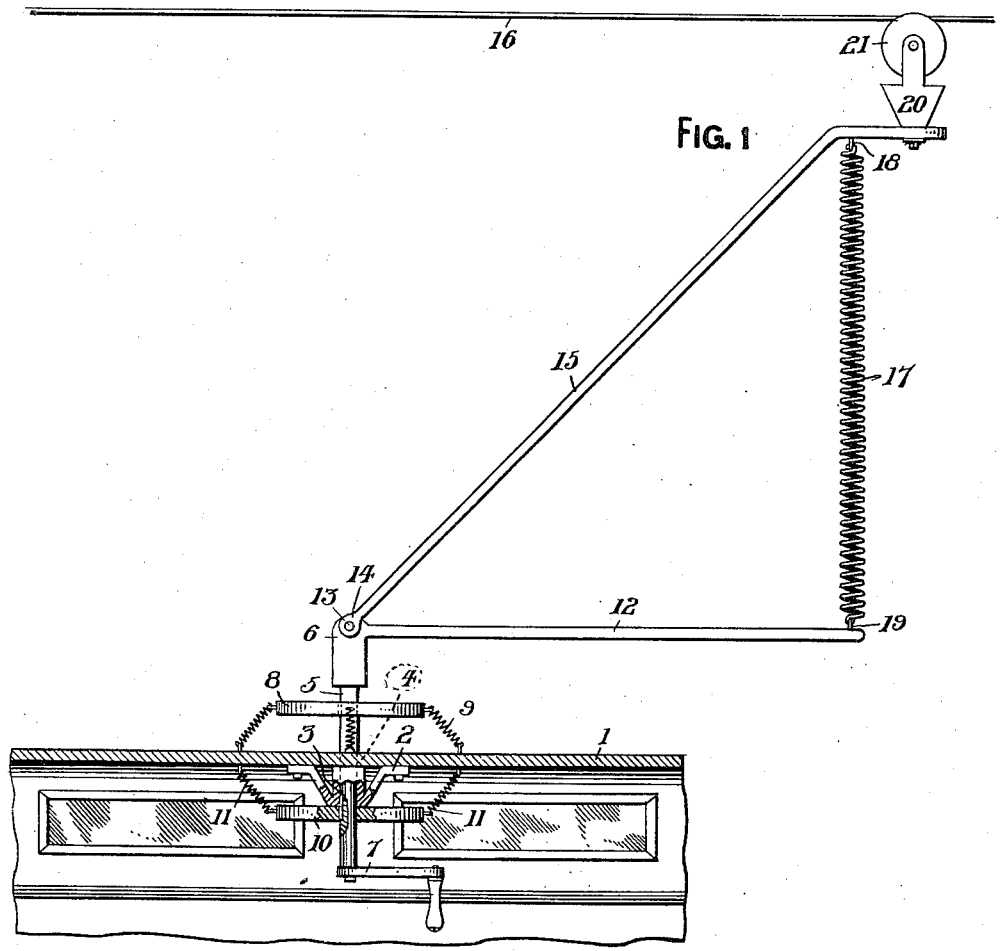

M. MELINSKI.
TROLLEY POLE.
APPLICATION FILED JULY 3, 1911.

1,013,673.

Patented Jan. 2, 1912.

WITNESSES:

INVENTOR.
M. Melinski
BY
ATTORNEYS

UNITED STATES PATENT OFFICE.

MYKOLAJ MELINSKI, OF ALBERT CITY, IOWA.

TROLLEY-POLE.

1,013,673.  Specification of Letters Patent.  Patented Jan. 2, 1912.

Application filed July 3, 1911. Serial No. 636,579.

*To all whom it may concern:*

Be it known that I, MYKOLAJ MELINSKI, a subject of the Emperor of Austria-Hungary, residing at Albert City, in the county of Buena Vista and State of Iowa, have invented certain new and useful Improvements in Trolley-Poles, of which the following is a specification, reference being had therein to the accompanying drawing.

This invention relates to trolley poles, and the objects of my invention are first, to furnish a trolley car with a pole that can be adjusted from the interior of the car; second, to provide a trolley pole that will adjust itself to the curvature of a wire or to any irregularities in the same; third, to prevent accidental displacement of a trolley wheel when rounding curved sections of a trolley wire, passing under guard rails and frogs; and fourth, to accomplish the above results by a pole that is durable and easy to manipulate.

I attain the above objects by a mechanical construction that will be hereinafter specifically described and then claimed.

Reference will now be had to the drawing, wherein:—

Figure 2:
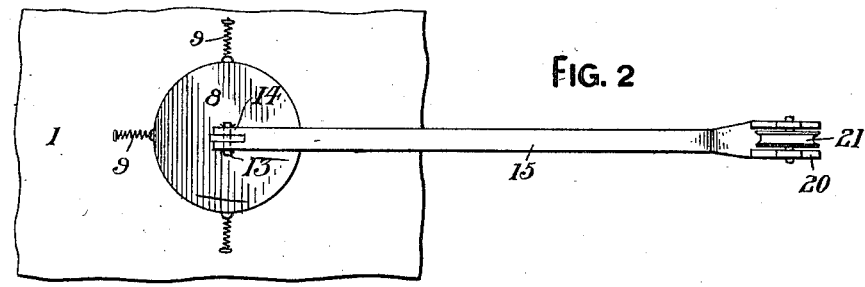
Figure 3:
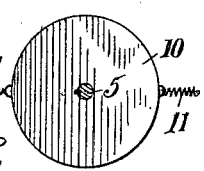

Figure 1 is a side elevation of a trolley pole in accordance with this invention. Fig. 2 is a plan of the same, and Fig. 3 is a horizontal sectional view of a portion of the pole.

The reference numeral 1 denotes a portion of a roof of a car, having a central depending bearing 2 with the opening 3 in said bearing vertically alined with an opening 4 in the roof 1. Rotatably mounted in the bearing and extending upwardly through the opening 4 is a post 5, having the upper end thereof provided with a head 6 and the lower end thereof with a crank 7. Mounted upon the post 5 adjacent to the head 6 is a disk 8, having the outer edges thereof connected by a plurality of coiled and retractile springs 9 to the top of the roof 1. Mounted upon the post 5 and only held in engagement with the lower end of the bearing 2 is a disk 10, having the edges thereof connected to the roof 1 by oppositely disposed retractile springs 11. The head 6 is provided with a rearwardly extending fixed arm 12, normally held in parallelism with the top of the roof 1. Pivotally connected to the head 6 by a transverse pin 13 is the bifurcated end 14 of an angularly disposed pole 15, having the upper end thereof bent rearwardly in a horizontal plane.

The rear end of the trolley pole is adapted to be maintained in parallelism with the arm 12 of a trolley wire 16 by a coiled spring 17, having the upper end thereof connected to the trolley pole, as at 18, and the lower end thereof connected to the arm 13, as at 19.

Swiveled upon the upper end of the trolley pole is a harp 20, having revoluble trolley wheel 21 adapted to travel upon the wire 16. The tension of the spring 17 is such that the wheel 21 will be normally retained in engagement with the wire 16, and should a guard rail, frog, or any irregularity be encountered in the wire 16, the spring will allow the wheel to recede, but immediately restore it to its normal position upon the irregularity being passed. The tension of the spring is also such that should the wheel 21 jump the conductor 16, the wheel 21 would move, say, 3 or 4 inches above the conductor. The tension of the spring 17 is not such as to move the arm 15 to a vertical position when the trolley wheel jumps the conductor. Should the trolley wheel 21 be displaced, it is only necessary for the conductor or operator of the car to grip the crank 7 and pull downwardly upon the post 5, this movement of the post places the springs 11 under tension, as the disk is lowered. When pulling downwardly upon the post 5, the disk 8 is carried therewith, and the post is held in a manner that will allow it to rotate, whereby the springs 9 of the disk 8 can center the post, whereby the trolley wheel will be positioned directly beneath the wire 16. By then gradually releasing the post 5, the springs 11 elevate the same and the wheel 21 is placed in engagement with the wire 16.

From the foregoing it will be observed that the elements 8 and 9 are employed for correctly positioning the trolley pole and that the elements 10 and 11 are employed to restore the trolley pole to its proper position after having been manually lowered in order that the elements 8 and 9 can swing the pole into position.

With a little practice on the part of the conductor or operator of a car, it is easy to determine when the trolley wheel is upon the wire, or in proximity thereto.

What I claim is:—

1. In a trolley, the combination with the car roof, of a post movably supported in said roof, disks mounted upon said post, retractile springs connecting the edges of said disks to said roof, a crank carried by the lower end of said post, and a trolley pole carried by the upper end thereof.

2. In a trolley, the combination with the car roof, of a post movably mounted therein, disks mounted upon said post, retractile springs connecting the edges of said disk to said roof, a crank carried by the lower end of said post, an arm carried by the upper end thereof, a pole pivotally supported by the upper end of said post, a spring connecting the upper end of said pole to the end of said arm, and a trolley wheel revolubly supported from the upper end of said pole.

In testimony whereof I affix my signature in the presence of two witnesses.

MYKOLAJ MELINSKI.

Witnesses:
  THOS. COLLINS,
  DAVE JOHNSON.

---

Copies of this patent may be obtained for five cents each, by addressing the "Commissioner of Patents, Washington, D. C."